United States Patent

[11] 3,563,404

| [72] | Inventor | Ward E. Barchus<br>2803 W. Burnham St., Milwaukee, Wis. 53215 |
|---|---|---|
| [21] | Appl. No. | 767,706 |
| [22] | Filed | Oct. 15, 1968 |
| [45] | Patented | Feb. 16, 1971 |

[54] SANITARY INSULATED CONTAINER FOR SEMISOLID SUBSTANCES
3 Claims, 7 Drawing Figs.

| [52] | U.S. Cl. | 220/9, 220/15 |
|---|---|---|
| [51] | Int. Cl. | B65d 25/18 |
| [50] | Field of Search | 220/9, 10, 15, 17 |

[56] References Cited
UNITED STATES PATENTS

| 427,643 | 5/1890 | Wales | (220/9UX) |
| 1,160,939 | 11/1915 | Mock | 220/15 |
| 1,503,762 | 8/1924 | Mock | 220/9 |
| 2,076,550 | 4/1937 | Conner | 215/13 |

FOREIGN PATENTS

| 10,147 | 11/1932 | Australia | 220/9 |
| 876,685 | 6/1944 | France | 220/9 |
| 1,245,927 | 10/1960 | France | 220/10 |
| 264,155 | 1/1950 | Switzerland | 220/9 |

Primary Examiner—Joseph R. Leclair
Assistant Examiner—James R. Garrett
Attorney—Thomas F. Kirby ABSTRACT: A sanitary insulated container for a semisolid substance such as butter or the like comprises a walled receptacle, a cover with depending sides, cover supporting means associated with the receptacle, and cover directing means associated with the receptacle. As the cover is put in place, it is directed to a predetermined position on the cover supporting means in such a manner that the cover edges and inner surfaces of the depending sides do not touch the top edge of the walled receptacle. When in place, a small clearance space exists between the top edge of the walled receptacle and the inside of the cover and thermal insulating space exists between the walls of the receptacle and the depending sides of the cover. If preferred, the top edge of the walled receptacle may touch the inside of the cover to eliminate the clearance space and form a seal.

PATENTED FEB 16 1971 3,563,404
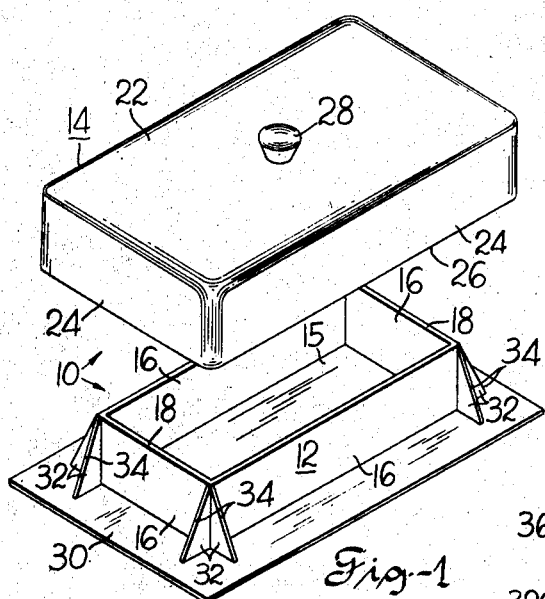
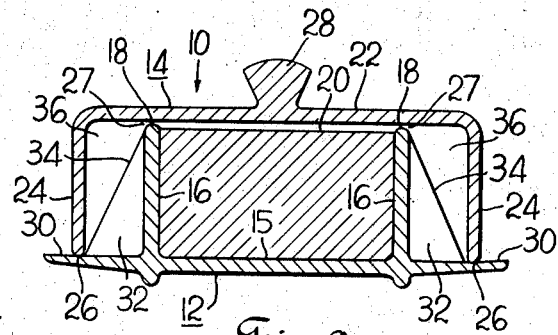
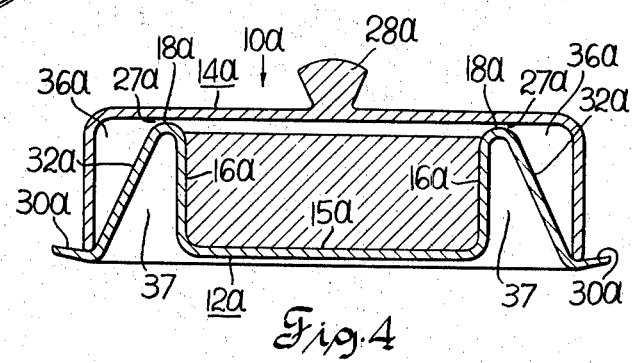
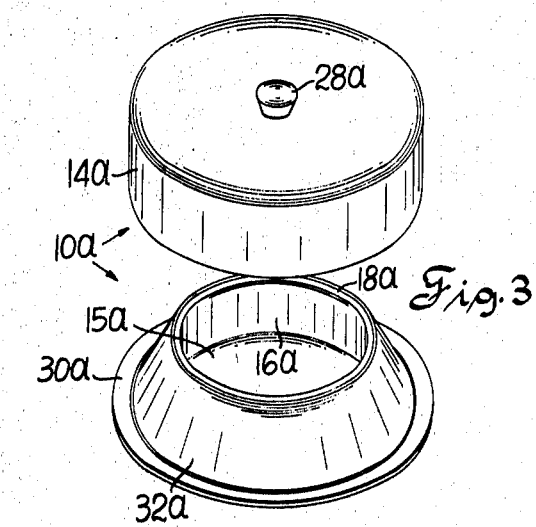
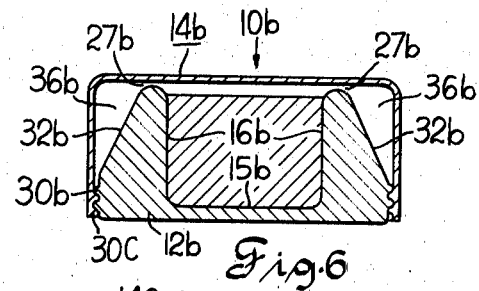
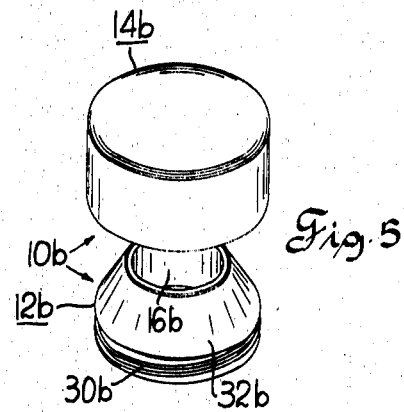
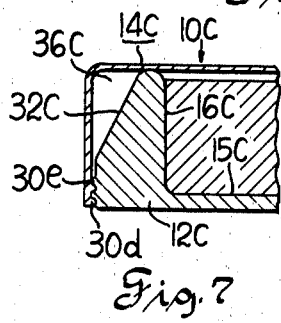
Inventor
Ward E. Bacchus
By Thomas F. Kirby
Attorney

SANITARY INSULATED CONTAINER FOR SEMISOLID SUBSTANCES

SUMMARY OF THE INVENTION

This invention relates generally to sanitary insulated containers for semisolid substances such as butter, grease or the like. More particularly, it relates to such containers, such as butter dishes or the like, which comprise a walled receptacle and a removable cover having depending sides.

A wide variety of containers for holding and serving semisolid substances such as butter, jelly, lubricants, shoe polish and so forth are commercially available. Some are so constructed that when in use some of the substance adheres to the top edge of the receptacle and is subsequently transferred to the cover as the latter is put in place or removed. This creates an unsightly and unsanitary condition and the user runs the risk of soiling his hands and clothing. One type of butter dish, for example, comprises a small plate on which a stick of butter rests and a cover of inverted U-shape cross section which fits thereover. Unless care is exercised, the cover edge and inside wall surface of the cover invariably makes direct contact with the butter stick as it is being removed or replaced. Another type of butter dish is simply a bowl having a cover which rests on the top edge of the bowl. Any butter on the bowl edge is transferred to the cover edge. In some shoe polish cans, the sidewalls of the container and cover make direct contact at practically all points and transfer of polish in to the inside of the cover is unavoidable.

Another problem with containers of the aforedescribed type is that the semisolids are not well insulated and the contents are exposed to ambient temperatures which may cause melting of the contents. It is desirable, therefore, to provide improved containers for semisolid substances.

In accordance with the present invention, there is provided a sanitary insulated container for a semisolid substance such as butter or the like which comprises a walled receptacle, a cover having depending sides, cover supporting means associated with the receptacle, and cover directing means associated with the receptacle. As the cover is put in place, it is directed to a predetermined position on the cover supporting means in such a manner that the cover edges and inner surfaces of the depending sides do not touch the top edge of the walled receptacle. When in place, a small clearance space exists between the top edge of the walled receptacle and the inside of the cover and thermal insulating space exists between the walls of the receptacle and the depending sides of the cover. In another embodiment, no clearance space exists between the top edge of the walled receptacle and the cover and a seal is formed.

OBJECTS OF THE INVENTION

It is an object of the invention to provide improved sanitary insulated containers for semisolid substances.

Another object is to provide such a container which comprises a receptacle and a cover and which is so constructed that the cover, when being removed or replaced or when in place, makes minimum contact with the top edge of the container.

Another object is to provide a container which is provided with thermal insulating space between the receptacle walls and the cover when the latter is in place.

Another object is to provide such containers wherein the cover merely rests in place on a cover supporting means associated with the receptacle.

Another object is to provide such containers wherein the cover interengages with the cover supporting means.

Another object is to provide a container wherein a leak or spillproof seal is formed between the top edge of the receptacle wall and the inside of the top surface of the cover.

Another object is to provide improved butter dishes in accordance with the aforesaid objects.

Other objects and advantages of the invention will hereinafter appear.

DRAWINGS

The accompanying drawing illustrates three embodiments of the invention but it is to be understood that the embodiments illustrated are susceptible of modifications with respect to details thereof without departing from the scope of the appended claims.

In the drawing:

FIG. 1 is an exploded isometric view of a first embodiment of a sanitary insulated container in accordance with the present invention;

FIG. 2 is a cross-sectional view of the container shown in FIG. 1;

FIG. 3 is an exploded isometric view of a second embodiment of a container in accordance with the present invention;

FIG. 4 is a cross-sectional view of the container shown in FIG. 3;

FIG. 5 is an exploded isometric view of a third embodiment of a container in accordance with the present invention;

FIG. 6 is a cross-sectional view of the container shown in FIG. 5; and

FIG. 7 is a cross-sectional view of a portion of a container similar to that of FIG. 6 but having its receptacle edge in contact with the inner surface of the top wall of the cover.

DESCRIPTION OF THE INVENTION

Referring to FIGS. 1 and 2 of the drawing, the numeral 10 designates a sanitary insulated container, such as a butter dish, in accordance with one embodiment of the invention. Container 10 comprises a receptacle 12 and a cover 14. FIG. 1 shows cover 14 removed and FIG. 2 shows it in place.

Receptacle 12 comprises a bottom 15 and a plurality of sidewalls 16 which have a top edge 18. FIG. 2 shows receptacle 12 filled, for example, to a line 20 with a semisolid substance such as butter or the like.

Cover 14 comprises a top 22 and a plurality of depending walls or sides 24 having a bottom edge 26 and, preferably, is provided with a handle 28.

Cover supporting means are provided and take the form of a flange, lip or ledge 30 which is associated with receptacle 12 and extends outwardly therefrom near the bottom thereof and, preferably, is integrally formed therewith.

Cover directing and locating means are provided and take the form of a plurality of triangularly-shaped members 32 which are associated with receptacle 12 and, preferably, are integrally formed with receptacle 12 and the cover supporting means. At least one member 32 is provided on each side of receptacle 12. As FIG. 2 best shows, each member 32 presents a sloped edge 34 on which the bottom edge 26 of the sides 24 of the cover 14 will ride in the event that the cover is not accurately aligned as it is being removed or replaced. The members 32 interfere with cover 14 so that edge 26 and the inside surface of depending walls 24 do not contact the walls 16 or edge 18 of receptacle 12.

As FIG. 2 further shows, when cover 14 is in place, the bottom edge 26 of its sides 24 rest on lip 30 and the dimensions of the cover are such that it fits over the member 32 in a predetermined position. The walls 16 of receptacle 12 are of such a height with respect to cover 14 that a small clearance space 27 exists between the top edge 18 of the walls and the inside surface of the cover. This clearance space should be large enough so that it normally prevents transfer of any substance in receptacle 12 or on the top edge 18 thereof to the inside surface of cover 14. However, the clearance space should be as small as possible to inhibit air circulation and heat transfer therethrough. FIG. 2 also shows that a thermally insulating air space 36 exists between cover 14 and the sidewalls 16 of receptacle 12. The space 36 serves to insulate and keep cool the substance in receptacle 12.

Referring to FIGS. 3 and 4 of the drawing, the numeral 10a designates a container in accordance with a second embodiment of the invention. Container 10a comprises a receptacle 12a and a cover 14a having a handle 28a. Receptacle 12a comprises a bottom 15a and a cylindrical sidewall 16a which has a top edge 18a. Cover directing and locating means in the form of a conical or sloped member 32a are integrally formed with receptacle 12a. Cover supporting means in the form of a circular disclike flange 30a are integrally formed with the cover directing means. Container 10a functions in the same manner as container 10 hereinbefore described in connection with FIGS. 1 and 2. Container 10a is provided with a clearance space 27a and with thermally insulating air space 37 in addition to a space 36a which corresponds to space 36 in container 10. Preferably, the outside of bottom 15a of receptacle 12a is constructed as shown so that it will be raised from the surface (not shown) on which container 10a would normally rest to enhance thermal insulation qualities.

Referring to FIGS. 5 and 6 of the drawing, the numeral 10b designates a container in accordance with a third embodiment of the invention. Container 10b, which for example might be a shoe polish container, comprises a receptacle portion 12b and a cover 14b. Receptacle portion 12b comprises a bottom 15b, a cylindrical interior sidewall surface 16b and a conical exterior surface 32b, all of which are integrally formed. Surface 32b serves as the cover directing and locating means. Cover supporting means are provided in the form of screw threads 30b on the bottom of receptacle portion 12b. The threads 30b are adapted to engage complementary screw threads 30c on the inside of cover 14b. Container 10b is also provided with an insulating space 36b and a clearance space 27b. Container 10b functions in the same manner as containers 10 and 10a hereinbefore described except that its cover 14b and receptacle 12b can be screwed together.

Referring to FIG. 7 of the drawing, the numeral 10c designates a container in accordance with a fourth embodiment of the invention. Container 10c, which for example may contain a semisolid or liquid substance prone to spill, comprises a receptacle portion 12c and a cover 14c. Receptacle portion 12c comprises a bottom 15c, a cylindrical interior sidewall surface 16c and a conical exterior surface 32c, all of which are integrally formed. Surface 32c serves as the cover directing and locating means. Cover supporting means are provided in the form of screw threads 30d on the bottom of receptacle portion 12c. The threads 30d are adapted to engage complimentary screw threads 30e on the inside of cover 14c. Container 10c is provided with an insulating space 36c but the top edge of the wall 16c of the receptacle portion 12c touches the inside surface of the top wall of cover 14c to form a leak or spillproof seal therebetween when the cover is in place and screwed tight. In this manner, a substance in receptacle portion 12c cannot spill into insulating space 36c if container 10c is tipped or upset.

The embodiments of the invention disclosed herein can be fabricated of the material which best suits their configuration and application. Thus, glass, ceramic, plastic, metal or other suitable materials could be employed.

The embodiments of the invention in which an exclusive property or privilege is claimed are defined as follows:

I claim:

1. In combination:

a receptacle having an upstanding sidewall with an exterior surface and a free top edge, cover supporting means comprising substantially planar projecting means around the periphery of said receptacle below said top edge and having an upper surface, a cover for said receptacle having a depending wall with a free bottom edge engageable with the upper surface of said cover supporting means, and cover directing means integrally formed with said cover supporting means and the sidewall of said receptacle but distinct from said sidewall for minimizing the risk of accidental physical contact between said cover and said top edge of said sidewall and for directing said cover to a predetermined position on said cover supporting means wherein the top edge of the sidewall is adjacent but spaced from said cover and an insulating space is defined between the depending wall of said cover and the sidewall of said receptacle, and said cover directing means comprising a plurality of triangularly shaped members which provide sloped edges extending between the upper surface of said cover supporting means and the sidewall of said receptacle below said top edge of said receptacle sidewall and which are outwardly extending around said receptacle.

2. A combination according to claim 1 wherein the sidewall of said receptacle comprises corners and wherein at least some of said plurality of triangularly shaped members are located near said corners and extend radially outwardly from said corners.

3. A combination according to claim 2 wherein said sidewall comprises four corners and wherein two of said members are located near each corner and extend radially outwardly from each said corner in transverse relationship to each other.